United States Patent
Landwehr et al.

(10) Patent No.: US 8,621,441 B2
(45) Date of Patent: Dec. 31, 2013

(54) SYSTEM AND METHOD FOR SOFTWARE IMMUNIZATION BASED ON STATIC AND DYNAMIC ANALYSIS

(75) Inventors: James M Landwehr, Summit, NJ (US); Juan Jenny Li, Basking Ridge, NJ (US); John Palframan, Middletown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 389 days.

(21) Appl. No.: 12/978,733

(22) Filed: Dec. 27, 2010

(65) Prior Publication Data

US 2012/0167060 A1   Jun. 28, 2012

(51) Int. Cl.
*G06F 9/44* (2006.01)
*G06F 11/00* (2006.01)

(52) U.S. Cl.
USPC .......... 717/131; 717/125; 717/127; 714/38.1; 714/39

(58) Field of Classification Search
None
See application file for complete search history.

(56) References Cited

U.S. PATENT DOCUMENTS

| | | | | |
|---|---|---|---|---|
| 5,854,924 | A * | 12/1998 | Rickel et al. | 717/132 |
| 6,275,223 | B1 * | 8/2001 | Hughes | 715/751 |
| 6,978,443 | B2 * | 12/2005 | Flanagan et al. | 717/127 |
| 7,168,009 | B2 * | 1/2007 | Darringer et al. | 714/38.1 |
| 7,272,823 | B2 * | 9/2007 | Ball | 717/125 |
| 7,426,661 | B2 * | 9/2008 | Schaefer | 714/38.1 |
| 7,506,312 | B1 * | 3/2009 | Girolami-Rose et al. | 717/124 |
| 7,596,778 | B2 * | 9/2009 | Kolawa et al. | 717/126 |
| 7,650,574 | B2 * | 1/2010 | Nattinger | 715/763 |
| 7,962,901 | B2 * | 6/2011 | McCamant et al. | 717/131 |
| 7,975,059 | B2 * | 7/2011 | Wang et al. | 709/230 |
| 8,209,658 | B2 * | 6/2012 | Mostow | 717/100 |
| 8,356,287 | B2 * | 1/2013 | Tzoref et al. | 717/130 |
| 8,381,187 | B2 * | 2/2013 | Fowler et al. | 717/125 |
| 2003/0131284 | A1 * | 7/2003 | Flanagan et al. | 714/38 |
| 2004/0040014 | A1 * | 2/2004 | Ball | 717/130 |
| 2005/0257203 | A1 * | 11/2005 | Nattinger | 717/154 |
| 2006/0020858 | A1 * | 1/2006 | Schaefer | 714/38 |
| 2006/0190923 | A1 * | 8/2006 | Jubran | 717/104 |
| 2007/0016894 | A1 * | 1/2007 | Sreedhar | 717/131 |
| 2007/0244942 | A1 * | 10/2007 | McCamant et al. | 707/206 |
| 2008/0127043 | A1 * | 5/2008 | Zhou et al. | 717/104 |
| 2008/0244536 | A1 * | 10/2008 | Farchi et al. | 717/130 |
| 2008/0276228 | A1 * | 11/2008 | Sreedhar | 717/131 |
| 2009/0070734 | A1 * | 3/2009 | Dixon et al. | 717/102 |
| 2009/0259989 | A1 * | 10/2009 | Cifuentes et al. | 717/110 |
| 2009/0328002 | A1 * | 12/2009 | Lin et al. | 717/120 |
| 2010/0023928 | A1 * | 1/2010 | Hentschel et al. | 717/124 |
| 2011/0022551 | A1 * | 1/2011 | Dixon | 706/12 |
| 2011/0246968 | A1 * | 10/2011 | Zhang et al. | 717/125 |
| 2011/0314450 | A1 * | 12/2011 | Shochat et al. | 717/124 |

OTHER PUBLICATIONS

Daniel Brand, A Software Falsifier, published by IEEE 2000, pp. 174-185.*

(Continued)

*Primary Examiner* — Tuan Q. Dam
*Assistant Examiner* — Zheng Wei

(57) ABSTRACT

Disclosed herein are systems, methods, and non-transitory computer-readable storage media for analyzing source code and identifying potential defects. The methods employ both static analysis and dynamic testing to detect program defects early in the development stage for better quality with less cost. The analysis also ranks identified potential defects and reports only the most likely defects to a human developer. Once defects are detected, they can be removed right away and similar defects can be prevented automatically.

20 Claims, 6 Drawing Sheets

(56) References Cited

OTHER PUBLICATIONS

Bessey et la., A Few Billion Lines of Code Later Using Static Analysis to Find Bugs in the REal World, published by Coomunicaitons of The ACM, col. 53, No. 2, Feb. 2010, pp. 66-75.*
Ayewah et al., Using Static Analysis to Find Bugs, publihsed by IEEE Computer Society, 2008, pp. 22-29.*
Ostrand et al., "Using Static Analysis to Determine Where to Focus Dynamic Testing Effort", Proceedings of the Second International Workshop on Dynamic Analysis (WODA 2004), Edinburgh, Scotland, http://www.cs.virginia.edu/woda2004, May 25, 2004.
James H. Andrews, "Deriving State-Based Test Oracles for Conformance Testing", Department of Computer Science University of Western Ontario, London, Ontario, Canada N6A 5B7, Proceedings of the Second International Workshop on Dynamic Analysis (WODA 2004), Edinburgh, Scotland, http://www.cs.virginia.edu/woda2004, May 25, 2004.
Sampath et al., "Towards Defining and Exploiting Similarities in Web Application Use Cases through User Session Analysis", Proceedings of the Second International Workshop on Dynamic Analysis (WODA 2004), Edinburgh, Scotland, http://www.cs.virginia.edu/woda2004, May 25, 2004.
Maebe et al., "Precise detection of memory leaks", Ghent University, ELIS Department, Sint-Pietersnieuwstraat 41, 9000 Gent, Belgium, Proceedings of the Second International Workshop on Dynamic Analysis (WODA 2004), Edinburgh, Scotland, http://www.cs.virginia.edu/woda2004, May 25, 2004.
Sen et al., "On Specifying and Monitoring Epistemic Properties of Distributed Systems", Department of Computer Science, University of Illinois at Urbana Champaign, Proceedings of the Second International Workshop on Dynamic Analysis (WODA 2004), Edinburgh, Scotland, http://www.cs.virginia.edu/woda2004, May 25, 2004.
Cook et al., "Ideas for E_cient Hardware-Assisted Data Breakpoints", Department of Computer Science, New Mexico State University, Las Cruces, NM 88003 USA, Proceedings of the Second International Workshop on Dynamic Analysis (WODA 2004), Edinburgh, Scotland, http://www.cs.virginia.edu/woda2004, May 25, 2004.
Lee et al., "SAAT: Reverse Engineering for Performance Analysis", *Software Center, Corporate Technology Operations, Samsung Electronics Co. Ltd.*, Proceedings of the Second International Workshop on Dynamic Analysis (WODA 2004), Edinburgh, Scotland, http://www.cs.virginia.edu/woda2004, May 25, 2004.
Metz et al., "Performance Data Collection: Hybrid Approach", *Nokia Research Center* 5 Wayside Road, Burlington, MA 01803, USA, Proceedings of the Second International Workshop on Dynamic Analysis (WODA 2004), Edinburgh, Scotland, http://www.cs.virginia.edu/woda2004, May 25, 2004.
Trofin et al., "Using Runtime Information for Adapting Enterprise Java Beans Application Servers", Proceedings of the Second International Workshop on Dynamic Analysis (WODA 2004), Edinburgh, Scotland, http://www.cs.virgina.edu/woda2004, May 25, 2004.
Demsky et al., "Efficient Specification Assisted Error Localization", Computer Science and Artificial Intelligence Laboratory, Massachusetts Institute of Technology, Cambridge, MA 02139, Proceedings of the Second International Workshop on Dynamic Analysis (WODA 2004), Edinburgh, Scotland, http://www.cs.virginia.edu/woda2004, May 25, 2004.
Auguston et al., "Run Time Monitoring of Reactive System Models", Proceedings of the Second International Workshop on Dynamic Analysis (WODA 2004), Edinburgh, Scotland, http://www.cs.virginia.edu/woda2004, May 25, 2004.

* cited by examiner

```
public class ID {
......
1      Public void setID(int i) {
2          This.id = id;          ← 310
3      }
4      public static int
5          random(int min, int max) {
6              if(max <= min) {
7                  return min;
8              }
9              return
10             Math.abs(RANDOM1.nextInt())     ← 320
11                 % (max - min) + min;
12     }
......
}
```

FIG. 6

```
public class test_setID
        extends TestCase {
    ID id;
    public void setup() {id = new ID();}
    public void test1() {
        id.setID(Integer.MIN_VALUE);
        assert(...);
    }
    public void test2() {
            int i = RANDOM.nextInt();
            id.setID(i);
            assert(...);
    }
    public void test3() {
        id.setID(Integer.MAX_VALUE);
        assert(...);
    }
    public void teardown() {id = null;}
}
```

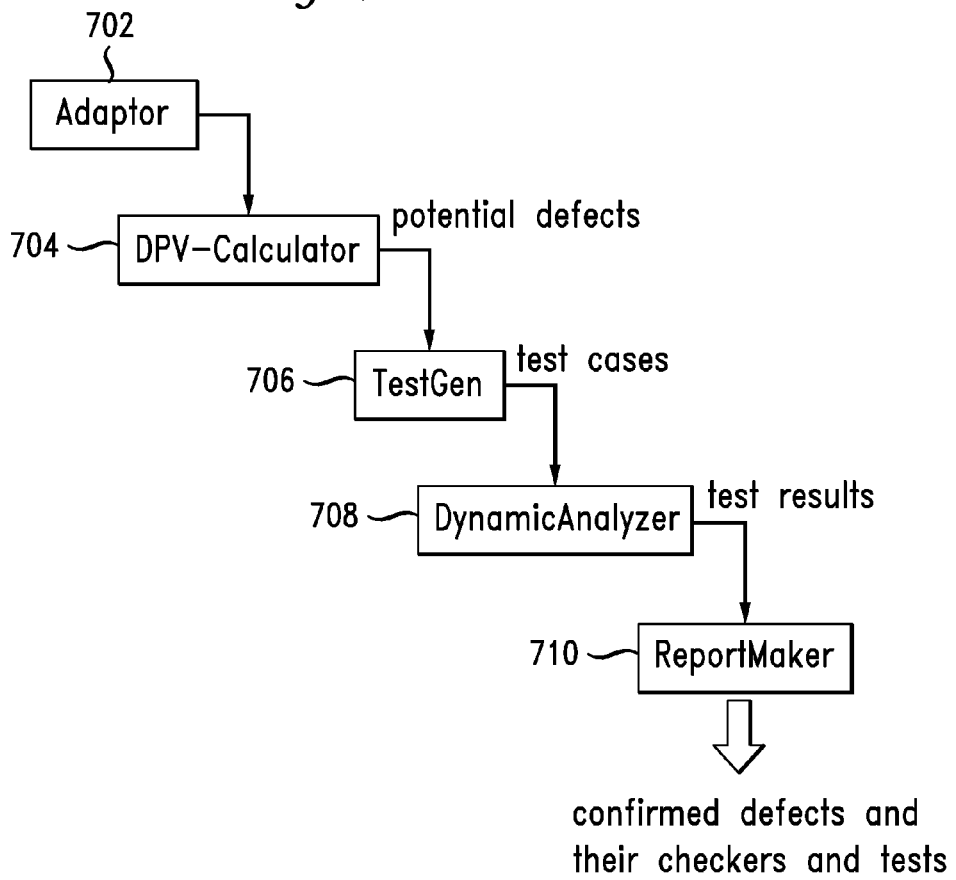

SYSTEM AND METHOD FOR SOFTWARE IMMUNIZATION BASED ON STATIC AND DYNAMIC ANALYSIS

BACKGROUND

1. Technical Field

The present disclosure relates to software analysis and more specifically to software code defect detection and correction.

2. Introduction

As part of the development process of software, the software code is analyzed to find and repair defects. One such approach used by developers is static program analysis. Static program analysis uses many checkers to discover a very large number of programming issues. Static analysis, however, is known to identify many portions of code that might initially appear erroneous but in fact are defect free. These are commonly known as false-positives. As each potential defect requires significant manual effort to process, understand, and correct, software engineers often spend a lot of time searching for and analyzing false positives that are not actual problems while other errors and flaws can remain. Because of this false-positive issue, the static analysis approach is seldom put to its full usage by many software development teams.

Furthermore, if one defect is found and corrected, more of the same are likely to exist in the same codebase or in other code from the same author. The remaining defects, although possibly similar to those previously found and corrected will also need to be located and corrected using the same process. Thus, fixing the same problems reoccurring in different places in the code can unnecessarily require the same amount of effort as fixing it the first time, namely requiring some amount of human developer attention.

Accordingly, there is a perceived need for a software analysis tool that more appropriately focuses human efforts on potential defects identified in a static analysis process as being an actual defect. By prioritizing potential defects, a developer can spend more attention on identified defects that have a higher likelihood of being real (i.e., not a false-positive). Further, there is also a perceived need for a software analysis tool that can automatically apply fixes to other portions of the code identified as having a similar defect as one previously confirmed and corrected. Such a solution has the potential of reducing the time spent by a developer in repairing software code defects.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for identifying, prioritizing, and repairing potential code defects. Herein disclosed are embodiments for identifying potential software code defects, testing the potential defects, and ranking each defect based on the initial identification and subsequent test outcome.

Static analysis can identify potential code defects. The results generated by the static checkers can be processed through dynamic analysis testing to minimize the number of false-positives. Then the identified potential code defects can be ranked according to their likelihood of being an actual defect. Thus, a human software developer can first examine and correct the defects that have been determined to have the highest likelihood of being an actual defect.

Another object is to automatically correct or propose corrections to subsequently identified defects that are similar to one or more defects that had been previously confirmed and corrected. Such a feature has the potential of minimizing the time spent by a human developer analyzing and correcting similar defects that have a likelihood of occurring throughout the code again and again. This approach can be especially useful for correcting idiosyncratic repetitive programming flaws originating from specific developers, for example.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates example software code;

FIG. 6 illustrates an example test set; and

FIG. 7 illustrates an example architecture of an automatic testing tool suite.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

The present disclosure addresses the need in the art for a software analysis tool that helps a developer to effectively identify software code defects. A system, method and non-transitory computer-readable media are disclosed which identify potential software code defects with a minimal number of false-positives. A brief introductory description of a basic general purpose system or computing device in FIG. 1 which can be employed to practice the concepts is disclosed herein. A more detailed description of the software analysis tool will then follow. These variations shall be discussed herein as the various embodiments are set forth. The disclosure now turns to FIG. 1.

Figure 1:
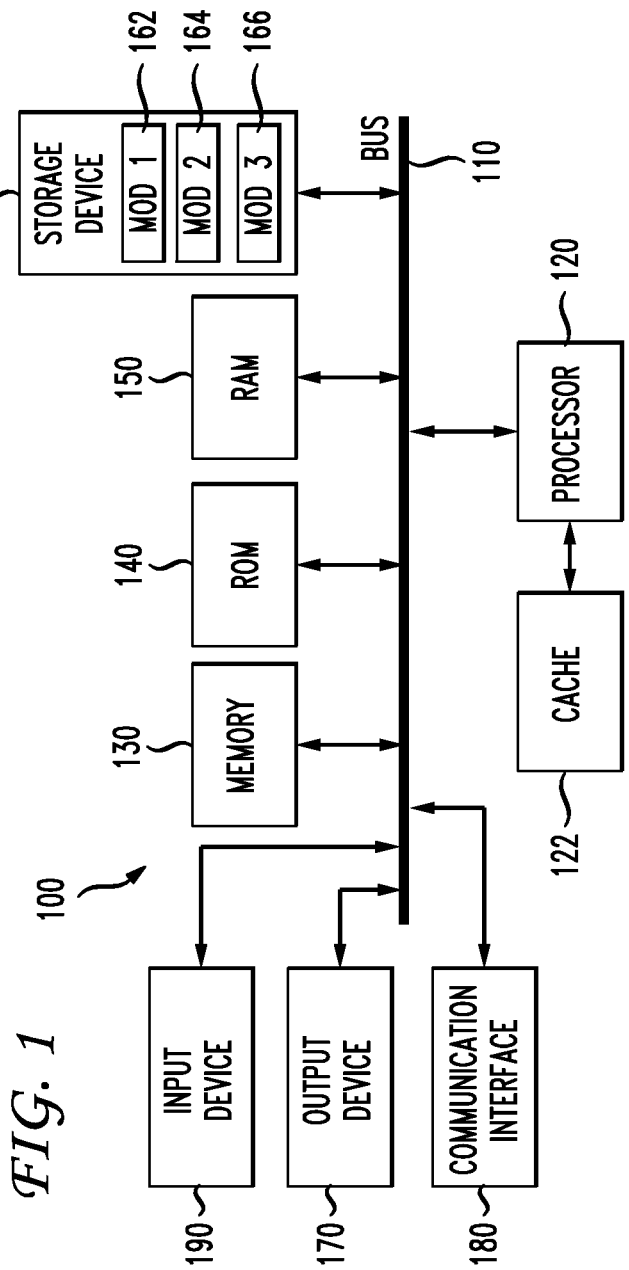
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120.

The system 100 can include a cache of high-speed memory 122 connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 can be available for use as well. The memory 130 can include multiple different types of memory with different performance characteristics. It can be appreciated that the disclosure can operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 can essentially be a completely self-contained computing system, containing multiple cores or processors, a bus, memory controller, cache, etc. A multi-core processor can be symmetric or asymmetric.

The system bus 110 can be any of several types of bus structures including a memory bus or memory controller, a peripheral bus, and a local bus using any of a variety of bus architectures. A basic input/output (BIOS) stored in ROM 140 or the like, can provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 can be connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, can also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here can easily be substituted for improved hardware or firmware arrangements as they are developed.

For clarity of explanation, the illustrative system embodiment is presented as including individual functional blocks labeled as a "processor" or processor 120. The functions these blocks represent can be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments can include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, can also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules can be stored on the storage device 160 and loaded into RAM 150 or memory 130 at runtime or can be stored as would be known in the art in other computer-readable memory locations.

Figure 2:
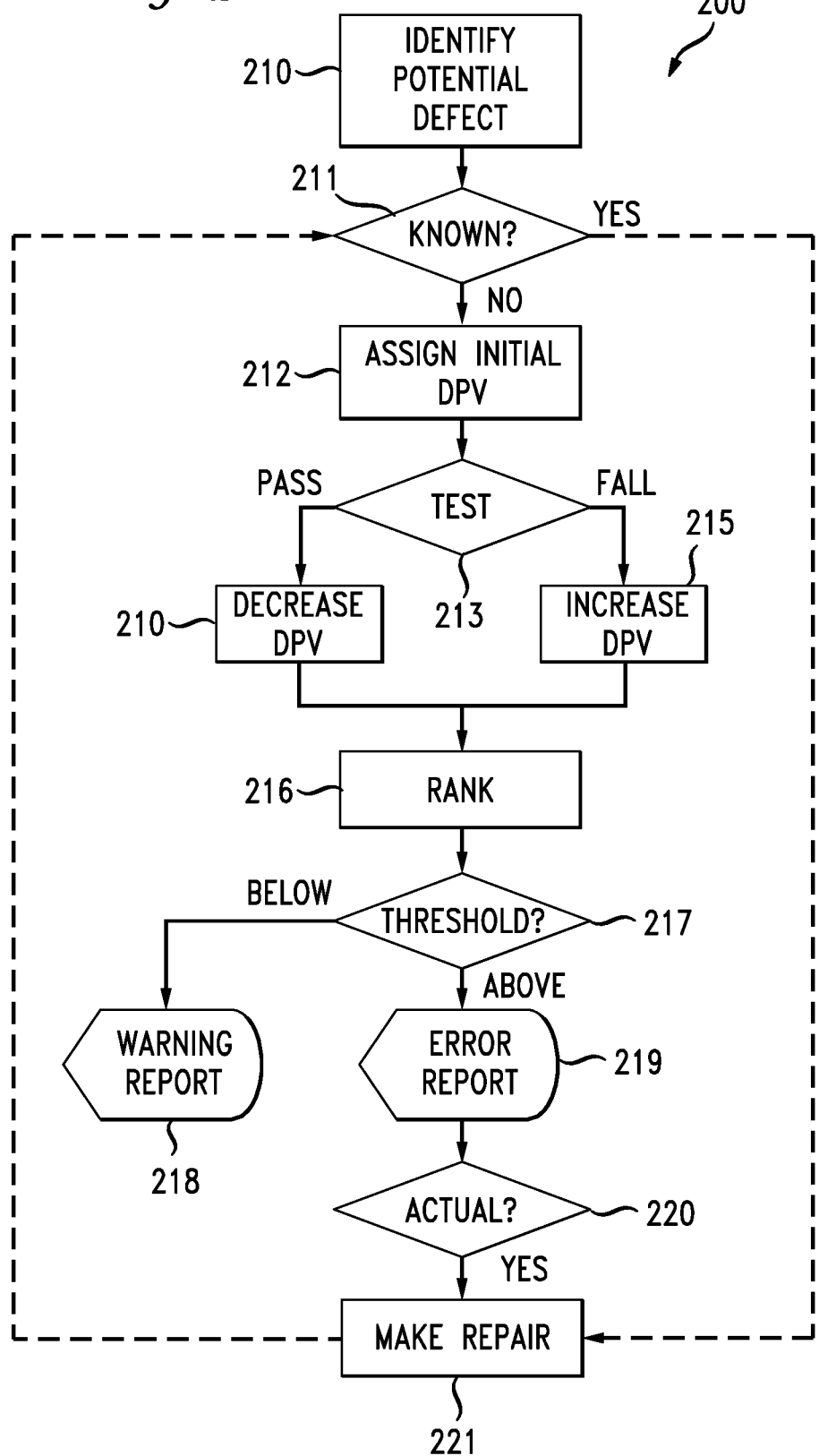
FIG. 2 illustrates a method embodiment for analyzing software code.

Having disclosed some basic system components and concepts, the disclosure now turns to an exemplary method embodiment shown in FIG. 2. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The present system and method is particularly useful for assisting in the identification and repair of one or more software code defects. One exemplary process in performing these tasks is shown in FIG. 2. In FIG. 2, the process 200 begins with the identification of a potential source code defect 210. The identification step 210 can be performed similar to that of a static analysis process. Static analysis is generally known in the art to analyze the code without actually executing a program that is built from the code. The static analysis process can apply a series of "checkers" to the source code and identify a wide range of potential errors. One checker example is a memory leak checker, which compares the number of times memory is assigned or allocated to the number of times memory is released to determine if all allocated memory has been properly reclaimed. Another example of a static checker is the checking of unit matching. The number of static checkers that exist is quite large and continues to grow. For example, Coverity and Klocwork each includes hundreds of checkers. Another checker example, described below for illustrative purposes, is a check of data flow consistency "def-used" pairs. Step 210 can run one or more of these checkers known in the field of practice but can also be updated from time to time with additional checkers as they are developed. The particular combination of checkers can be selected based on the codebase, authors, desired flaws to correct, available processing time, and so forth.

Static analysis detects potential issues in a program without pointing out exact failures that the potential issues can cause. Consequently, the static analysis process, although very good at finding a large quantity of actual source code defects, can also identify a large number of false-positives. Thus, the additional steps in process 200 can be used to separate out the actual defects from the false-positives and/or prioritize the detected source code defects so that a developer can focus on more urgent or serious flaws first.

If one or more potential defects are identified in step 210, they can optionally be compared to, or treated similarly as, other known defects in optional step 211, which will be discussed in more detail below.

If an identified potential defect was not recognized as known by optional step 211, it can be assigned an initial default potential value ("DPV") in step 212. The assignment of the DPV can be performed using a heuristic-based approach, for example, categorizing the defects into "severe," "major," "minor," and "correct" and assigning scores of 3, 2, 1, and 0, respectively. While integers are discussed herein, the defects can be categorized anywhere along a scale of 0 to 5, for example, with any integer or floating point value. One example of heuristics is the rareness of a defect. For example, as discussed in more detail in the process example below, a unique occurrence of assigning a value to itself can indicate a higher defect potential because it could most likely be an unintended developer error.

Figure 4:
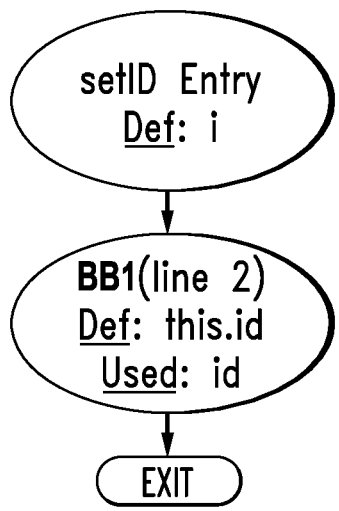
FIG. 4 illustrates a data flow graph of a portion of the example software illustrated in FIG. 3.
Figure 5:
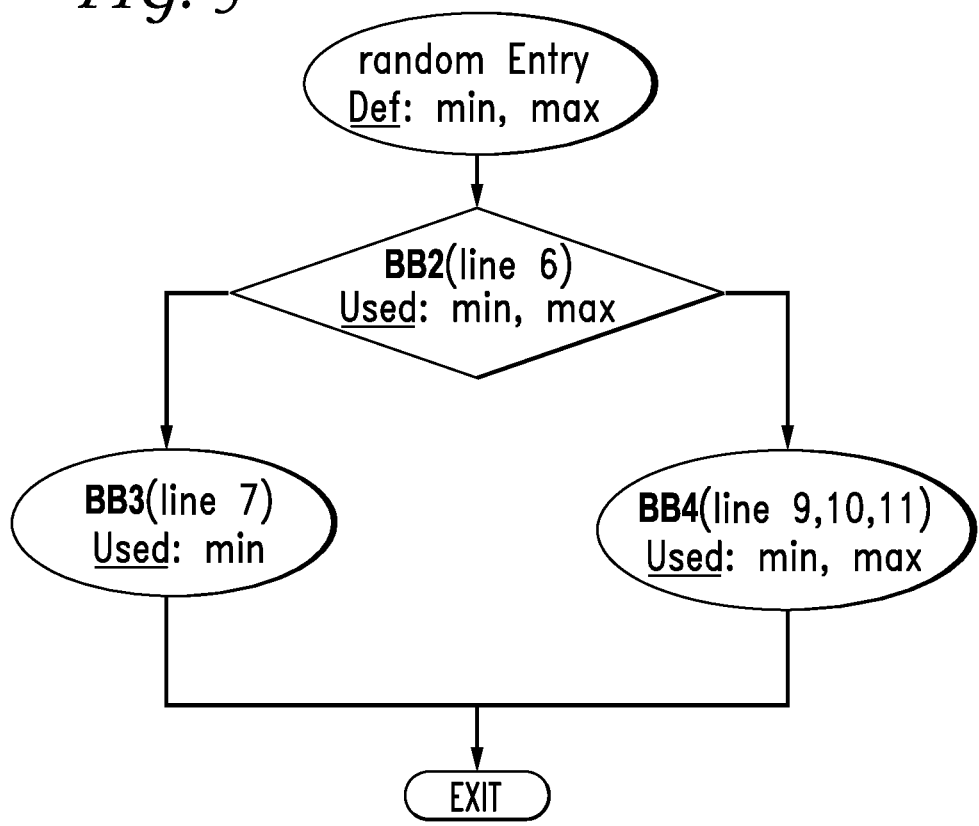
FIG. 5 a data flow graph of another portion of the example software illustrated in FIG. 3.

The assignment step 212 can also preferably include the generation of one or more data flow graphs ("DFG") of the program under analysis (this step is not shown in FIG. 2). A program DFG represents all possible execution data flows, in which each node is a sequence of non-branching statements (basic block) and each directional edge represents the direction of the flow. The DFGs of the program segments in FIG. 3 are shown in FIGS. 4 and 5 and will be discussed in more detail below.

The testing step 213 can include generating and running tests of the sections of code that contain the identified potential defect to trigger failures. The testing performed can be similar to the testing performed by a dynamic analyzer. For example, the testing step can execute some or all of the code containing the identified potential defect on a real or virtual processor. When the code is executed, a number of test inputs can be used in an attempt to produce interesting behavior. In some preferred embodiments, a sufficient group of test inputs can be used to ensure that the tester has adequately observed a sufficient portion of the code's possible behaviors. For example, input values can include a smallest value, a random number mid-range value, and the largest value of the input range.

For each failure identified in testing step 213, the process 200 increases the DPV in step 214, thus indicating that the potential code defect is more likely to be real. For each pass in testing step 213, the process 200 decreases the DPV in step 215, thus indicating that the defect is less likely to be real. The potential code defect can then be ranked among the other found potential code defects by their respective DPV in step 216. Depending on whether the potential defect is above or below a predetermined threshold DPV value, step 217 determines whether the potential defect is sent to warning report 218 (below) or to error report 219 (above). The potential code defects in error report 219 are those with the highest DPV value and can therefore have the highest likelihood of being actual code defects.

A human developer, in step 220, can review the ranked potential defects reported in 219 and confirm the actual defects. Upon confirming a potential defect to be an actual defect, the human developer can then correct the defect, as indicated by step 221.

Optionally, the repair step 221 can also include gathering the information relating to confirmed defects and the subsequent corrections made and supply that information to the identification step 211. Having this information, step 211 can then compare subsequently-identified potential defects to confirmed defects. When step 211 finds a potential defect to be sufficiently similar to a confirmed defect, that defect can be deemed an actual defect and automatically repaired in step 221 with little or no human interaction. Consequently, a human developer can avoid having to review and repair similar errors occurring elsewhere in the code.

Having generally summarized some of the steps of process 200, the disclosure now turns to the detailed operation of process 200 by applying it to an example section of source code 300 shown in FIG. 3.

The source code 300 shown in FIG. 3 is a Java program. When process 200 is applied to source code 300, the two checkers in identification step 210 identify two potential source code defects: as self-assign, 310, and a possible-negative return, 320. Even though these errors seem obvious to most software developers, they are real defects and can be found in real industrial released code. Further, such errors are not so easy to detect when they are hidden in millions of lines of code and among hundreds and thousands of issues identified by the static analysis results. Therefore, this example is a good representation of a typical program segment on which developers can use this process to find potential defects.

The static checker in step 210 that found defect 310 uses traditional data flow analysis technique, "def-used" pairs, to discover defects. The term "def" means definition of a variable, either being initialized or assigned a value. The term "used" means a variable is used either in calculation (c-use) or in predicates (p-use). For each definition, e.g. "a=b", the checker compares the variable to be defined ("a") and the variable to be used ("b") to make sure they are different variables; otherwise a "self-assigned" defect will be discovered. For example, highlighted statement 310, "this.id=id" has a "def" of "this.id" and "use" of "id." Even though they are syntactically different, the two variables are in fact the same one since the local variable was likely erroneously typed in as "i" rather than "id." The correct method header should have been "public setID(int id) {". In this case, the "def-use" technique in step 210 identifies the self-assign error.

Another checker in step 210 searches for improper usage of functions from math library and identifies the potential defect identified in 320. It is more of a Java Math lab issue than the program issue. The checker discovers that the random number could be the value of Integer.MIN_VALUE, which can trigger the "Math.abs( )" function to return a negative number. First of all, the probability of the random number generator generating the minimal integer value is extremely small. Secondly, negative numbers might not be acceptable for most usage of "abs" function, but it is acceptable in this case because the impact of returning a value slightly smaller than "min" is negligible. Therefore, for most developers, this defect would be considered a false alarm or a trivial defect not worth fixing.

When analyzing this very small program segment 300, the checkers return a 50% false positive rate. As the number of lines of program code grows, the number of detected potential defects would also grow substantially. It is the remainder of the process 200 that filters out the defects having a high defect potential from these false-positives.

Assuming that the identified code defects are not recognized as "known" in step 211, process 200 generates a DFG of the program defects in step 212 and then runs heuristics to prioritize defects and optionally mark them on the optionally-created DFG.

A program DFG represents all possible execution data flows, in which each node is a sequence of non-branching statements (basic block) and each directional edge represents the direction of the flow. The DFGs of the program segments in FIG. 3 are shown in FIG. 4 and FIG. 5.

FIG. 4 and FIG. 5 are the respective DFGs of the methods 310 and 320 in the class of FIG. 3. They show basic blocks, BBx, of the program. In FIG. 4, BB1 (Basic Block 1, line 2 of the program) uses the variable "id" to assign a value to variable "this.id". In this example, the self-assignment issue was considered to be a "severe" error and assigned DPV value of "3" by step 212. The assignment was based on the heuristics that the occasionally occurring errors are most likely to be real because intentional or unintentional coding habits usually occur multiple times.

In FIG. 5, the defect identified at (BB4) was assigned a DPV value of "2" by step 212. This assignment was based on another heuristic that the out-of-range values can cause major problems, but not severe ones.

Once the DPV value of each DFG node is assigned in step 212, the code sections are executed in step 213 with various inputs to generate test data. Three values for each test input variable are selected: two boundary conditions and one random value within the boundary. For the testing of the simple program segments in FIG. 3, the input values to method 310 are the smallest value, a random number, and the largest value of the input range. FIG. 6 shows the three test cases generated to reach node BB1 of FIG. 4.

In the case of method 310, all three test cases failed. Note that even though the test case code and the input data are generated automatically, the testing oracle, i.e. the "assert" statement in the test case can be filled in manually. In this case, the assertion should be "id.getID==input". With the three failed tests and the original DPV of "3," step 215 increases the value to "6" for BB1.

For the validation of defect 320, automatic test generator again gives three values to each input parameter. Since it only has two input parameters, "min" and "max," it is a total of "9" combinatory for the two variables, each with three levels of values. Automatic execution of these nine test cases turns out to be positive, i.e. all nine tests passed. Thus, step 214 decreases the DPV initially assigned to BB4 from "2" to "−7." Since "0" is to be the lowest DPV value for correct code, the DPV of BB4 is now "0" after the testing step.

The last task of the automatic tester component is to rank the DPV values, step 216, and use a threshold, step 217, to determine true failures. Assuming that the threshold is three, the BB1 is then reported to error report 219. No defects are found in BB4 and all other basic blocks.

The error report 219 is presented to a human developer for further confirmation 220 and/or repair of the defect 221. Once the code is fixed through on-line patching or off-line code changes, the process 200 can rerun the checker and the test cases to validate that the defect is truly removed. The confirmed defect, test, and repair information can be then sent back to the static analyzer at step 211 where it can stay with the code to prevent similar errors or errors of the same types from occurring again. By doing so, the static analyzer can "learn" which checkers have previously found confirmed defects and assign higher DPVs to subsequent code identified by those checkers. Subsequently identified defects that are sufficiently similar to the confirmed defects can also be automatically repaired. In this example, all subsequently identified "self-assign" type of errors should be corrected and avoided.

FIG. 7 illustrates an example architecture of an automatic testing tool suite. The static checkers, preventers, and automatic testers can be implemented as part of a single automatic tester in an exemplary tool suite. Many existing static analysis tools are available either commercially or in the open-source space. These static analysis tools are often complimentary, i.e. providing different and yet complimentary sets of checkers. Therefore, the example architecture creates an adaptor 702 to link any static analysis results into the tool suite automatic testing. Because the preventer includes a partial manual step of bug fixing, it does not require a separate tool implementation, but is embedded in some features of the tool suite.

One feature of the tool suite is an automatic tester including five components in a pipeline or other suitable architecture as shown in FIG. 7. The adaptor 702 generates static analysis results for potential defects. The potential defects are fed to the DPV-Calculator 704 with heuristics to generate basic blocks with DPV. The basic blocks are fed to a TestGen 706 to generate test cases given in the source language, which are fed to a DynamicAnalyzer 708. The DynamicAnalyzer 708 runs and records testing results. The testing results are fed to a ReportMaker 710 which generates a confirmed defect report with their checkers and test cases.

The adaptor 702 first converts the static analysis results into a standard potential-defect report format and sends the results to the DPV-Calculator 704, which processes the defects in the following four steps. First, the DPB-Calculator 704 generates DFG of the programs. Second, the DPB-Calculator 704 uses heuristics to calculate DPV value of each defect. Third, the DPB-Calculator 704 marks the defects on their corresponding basic blocks of DFG with their DPV values. Fourth, the DPB-Calculator 704 finally sends the list of all basic blocks with DPV values to the next component, TestGen 706. TestGen 706 generates test cases to reach the basic blocks with the highest DPV value. For some systems with a sufficient number of existing tests, TestGen 706 may not be necessary. Instead the code coverage information of the existing tests can be used to select those that can reach blocks with high DPV values. The DynamicAnalyzer 708 takes in the results from testing, uses them to calculate a new DPV value for each basic block. The DynamicAnalyzer 708 can also calculate the testing code coverage. Then the ReportMaker 710 generates a report of basic blocks with the DPV values passing a certain threshold along with their corresponding checkers and test cases, so that the preventer can readily use the results in the software build environment.

Embodiments within the scope of the present disclosure can also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, minicomputers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. Those skilled in the art will readily recognize various modifications and changes that can be made to the principles described herein without following the example embodiments and applications illustrated and described herein, and without departing from the spirit and scope of the disclosure.

We claim:

1. A method comprising:
    identifying a potential source code defect;
    assigning a defect potential value to the potential source code defect;
    testing, via a processor, the potential source code defect to yield a testing result and a tested source code defect;
    updating the defect potential value based on the testing result to yield an updated defect potential value by increasing the defect potential value, when the testing result indicates that the tested source code defect is not a potential false positive;
    ranking the tested source code defect, among other tested non-false-positive source code defects, based on the updated defect potential value and respective defect potential values associated with the other tested non-false-positive source code defects; and
    presenting to a user an identified potential non-false-positive source code defect selected from among the ranked tested source code defect and the other tested non-false-positive source code defects, the identified potential non-false-positive source code defect having an associated defect potential value above a predetermined threshold value.

2. The method of claim 1, the method further comprising:
    labeling the potential source code defect as a confirmed source code defect upon receiving confirmation by the user that the potential source code defect is an actual source code defect; and
    receiving instructions from the user for correcting the confirmed source code defect.

3. The method of claim 2, the method further comprising:
    correcting a subsequently identified potential source code defect similar to the confirmed source code defect.

4. The method of claim 1, the method further comprising:
    generating a data flow graph relating to the potential source code defect, the data flow graph having a node; and
    marking one of the defect potential value and the updated defect potential value on the node of the data flow graph.

5. The method of claim 1, wherein testing the potential source code defect comprises:
    running a portion of source code containing the potential source code defect based on a first boundary condition;
    running the portion of the source code containing the potential source code defect based on a second boundary condition that is different than the first boundary condition; and
    running the portion of the source code containing the potential source code defect based on a condition that is a random value within the first and second boundary conditions.

6. The method of claim 1, wherein assigning the defect potential value is based on heuristic analysis.

7. The method of claim 1, wherein assigning the defect potential value is based on a previously confirmed defect.

8. The method of claim 1, wherein identifying a potential source code defect is performed by static code analysis comprising employing at least one static checker.

9. The method of claim 1, wherein testing the potential source code defect is performed by dynamic program analysis.

10. A system comprising:
    a processor; and
    a computer-readable storage device storing instructions which, when executed by the processor, cause the processor to perform operations comprising:
        identifying a potential source code defect in a source code file;
        assigning a defect potential value to the potential source code defect;
        testing the potential source code defect to yield a test result and a tested source code defect;
        updating the defect potential value based on the test result to yield an updated defect potential value by increasing the defect potential value, when the testing result indicates that the tested source code defect is not a potential false positive;

ranking the tested source code defect, among other tested non-false-positive source code defects, based on the updated defect potential value and respective defect potential values associated with the other tested non-false-positive source code defects; and presenting to a user an identified potential non-false-positive source code defect selected from among the ranked tested source code defect and the other tested non-false-positive source code defects, the identified potential non-false-positive source code defect having an associated defect potential value above a predetermined threshold value.

11. The system of claim 10, wherein the computer-readable storage device stores additional instructions which, when executed by the processor, cause the processor to perform further operations comprising:

receiving input from the user;

based on the input, labeling the identified potential source code defect as a confirmed source code defect; and correcting the confirmed source code defect based on the input.

12. The system of claim 11, wherein the computer-readable storage device stores additional instructions which, when executed by the processor, cause the processor to perform further operations comprising:

correcting a subsequently identified potential source code defect having an error of a same type as the confirmed source code defect.

13. The system of claim 10, wherein testing the potential source code defect comprises running a portion of source code containing the potential source code defect and inputting a first boundary condition, a second boundary condition, and a condition that is a random value within the first boundary condition and the second boundary condition.

14. The system of claim 10, wherein the computer-readable storage device stores additional instructions which, when executed by the processor, cause the processor to perform further operations comprising:

generating a data flow graph relating to the potential source code defect, the data flow graph having a node; and marking one of the defect potential value and the updated defect potential value on the node of the data flow graph.

15. The system of claim 10, wherein the computer-readable storage device stores additional instructions which, when executed by the processor, cause the processor to perform further operations comprising using heuristic analyses to assign a respective defect potential value to each identified potential source code defect.

16. A non-transitory computer-readable storage medium storing instructions which, when executed by a processor, cause the processor to perform operations comprising:

identifying a potential source code defect;

assigning a defect potential value to the potential source code defect;

testing a section of code containing the potential source code defect to yield a test result and a tested source code defect;

updating the defect potential value based on the test result to yield an updated defect potential value by increasing the defect potential value, when the testing result indicates that the tested source code defect is not a potential false positive;

ranking the tested source code defect, among other potential tested non-false-positive source code defects, based on the updated defect potential value and respective defect potential values associated with the other tested non-false-positive source code defects; and presenting, via a user interface, an identified potential non-false-positive source code defect selected from among the ranked tested source code defect and the other tested non-false-positive source code defects, the identified potential non-false-positive source code defect having an associated defect potential value above a predetermined threshold value.

17. The non-transitory computer-readable storage medium of claim 16, wherein testing the section of code comprises running the section of code and inputting a first boundary condition, a second boundary condition, and a condition that is a random value within the first boundary condition and the second boundary condition.

18. The non-transitory computer-readable storage medium of claim 16, storing additional instructions which, when executed by the processor, result in further operations comprising:

receiving a confirmation by a user that the potential source code defect is an actual source code defect;

labeling the potential source code defect as a confirmed source code defect; and correcting the confirmed source code defect based on an instruction from the user.

19. The non-transitory computer-readable storage medium of claim 18, storing additional instructions which, when executed by the processor, result in further operations:

identifying another potential source code defect of a same type as the confirmed source code defect; and correcting the another potential source code defect according to the instruction.

20. The non-transitory computer-readable storage medium of claim 16, storing additional instructions which, when executed by the processor, result in further operations comprising:

generating a data flow graph relating to the potential source code defect, the data flow graph having a node; and marking the defect potential value on the node of the data flow graph.

* * * * *